(12) United States Patent
Melzer et al.

(10) Patent No.: US 11,257,113 B2
(45) Date of Patent: Feb. 22, 2022

(54) INTERACTIVE USER INTERFACE BASED ON ANALYSIS OF CHAT MESSAGES CONTENT

(71) Applicants: Roy S. Melzer, Tel-Aviv (IL); Yuval Efrati, Ramat-HaSharon (IL)

(72) Inventors: Roy S. Melzer, Tel-Aviv (IL); Nir Bejarano, Ramat-Gan (IL); Yuval Efrati, Ramat-HaSharon (IL)

(73) Assignees: Roy S. Melzer, Tel-Aviv (IL); Yuval Efrati, Ramat-HaSharon (IL)

( * ) Notice: Subject to any disclaimer, the term of this patent is extended or adjusted under 35 U.S.C. 154(b) by 0 days.

(21) Appl. No.: 16/994,801

(22) Filed: Aug. 17, 2020

(65) Prior Publication Data

US 2020/0380559 A1 Dec. 3, 2020

Related U.S. Application Data

(63) Continuation of application No. 15/919,427, filed on Mar. 13, 2018, now Pat. No. 10,748,181, which is a
(Continued)

(51) Int. Cl.
*G06Q 30/02* (2012.01)
*G06Q 30/06* (2012.01)
(Continued)

(52) U.S. Cl.
CPC ..... *G06Q 30/0251* (2013.01); *G06F 16/9535* (2019.01); *G06Q 10/107* (2013.01);
(Continued)

(58) Field of Classification Search
None
See application file for complete search history.

(56) References Cited

U.S. PATENT DOCUMENTS

| 7,099,855 B1 | 8/2006 | Nelken et al. |
| 7,468,729 B1 | 12/2008 | Levinson |

(Continued)

FOREIGN PATENT DOCUMENTS

| WO | WO 2014/028647 | 2/2014 |
| WO | WO 2015/145430 | 10/2015 |
| WO | WO 2016/046824 | 3/2016 |

OTHER PUBLICATIONS

Advisory Action Before the Filing of An Appeal Brief dated Jun. 5, 2018 From U.S. Appl. No. 15/272,642. (3 pages).
(Continued)

*Primary Examiner* — Nicholas D Rosen

(57) ABSTRACT

A method of adapting an interactive user interface (UI) comprising monitoring textual content inputted to a user interface of an IM service by participant(s) of an IM session managed by the IM service, wherein the user interface is displayed on a display of a client device, performing an analysis of the textual content to identify query conditions defining at least one feature of the product or the service, generating an interactive UI according to at least a portion of the query conditions and an identity of the at least one participant, storing the adapted interactive UI to be available to a browser via a link, automatically inputting the link into the IM session so as to allow the participant(s) to access the adapted interactive UI using a browser running on the client device, and submitting an order based on completing data received from the participant(s) via the adapted interactive UI.

20 Claims, 7 Drawing Sheets

Related U.S. Application Data continuation of application No. 15/511,021, filed as application No. PCT/IL2015/050965 on Sep. 21, 2015, now Pat. No. 9,917,802.

(60) Provisional application No. 62/053,248, filed on Sep. 22, 2014, provisional application No. 62/092,344, filed on Dec. 16, 2014, provisional application No. 62/183,791, filed on Jun. 24, 2015.

(51) Int. Cl.
   *G06Q 10/10* (2012.01)
   *G06F 16/9535* (2019.01)
   *H04L 51/046* (2022.01)

(52) U.S. Cl.
   CPC ..... *G06Q 30/0255* (2013.01); *G06Q 30/0271* (2013.01); *G06Q 30/06* (2013.01); *G06Q 30/0611* (2013.01); *G06Q 30/0635* (2013.01); *H04L 51/046* (2013.01); *G06Q 30/0601* (2013.01)

(56) References Cited

U.S. PATENT DOCUMENTS

| | | | |
|---|---|---|---|
| 7,870,199 | B2 | 1/2011 | Galli et al. |
| 8,103,734 | B2 | 1/2012 | Galli et al. |
| 8,239,461 | B2 | 8/2012 | Jones et al. |
| 8,671,022 | B2 | 3/2014 | Sinn et al. |
| 8,850,472 | B2 | 9/2014 | Sharan et al. |
| 8,898,241 | B2 | 11/2014 | Jones et al. |
| 9,053,489 | B2 | 6/2015 | Jablokov et al. |
| 9,799,046 | B2 * | 10/2017 | Stoll ............... H04L 51/32 |
| 9,830,634 | B2 | 11/2017 | Garbow et al. |
| 9,917,802 | B2 | 3/2018 | Melzer et al. |
| 10,643,197 | B2 * | 5/2020 | Melzer ............ H04L 51/046 |
| 10,748,181 | B2 * | 8/2020 | Melzer ............ G06F 16/9535 |
| 10,832,236 | B2 * | 11/2020 | Melzer ............ G06Q 20/223 |
| 11,074,571 | B2 * | 7/2021 | Melzer ............ H04L 51/046 |
| 2002/0059098 | A1 | 5/2002 | Sazawa et al. |
| 2002/0178113 | A1 | 11/2002 | Clifford et al. |
| 2004/0162878 | A1 | 8/2004 | Lewis et al. |
| 2005/0086309 | A1 | 4/2005 | Galli et al. |
| 2006/0129455 | A1 | 6/2006 | Shah |
| 2006/0168054 | A1 | 7/2006 | Burkhart et al. |
| 2007/0083887 | A1 | 4/2007 | Gutta et al. |
| 2007/0219901 | A1 | 9/2007 | Garbow et al. |
| 2008/0147514 | A1 * | 6/2008 | Shuster ............ G06Q 30/0633 705/26.8 |
| 2008/0177600 | A1 | 7/2008 | McCarthy et al. |
| 2009/0006333 | A1 | 1/2009 | Jones et al. |
| 2010/0161415 | A1 | 6/2010 | Mandel |
| 2010/0235235 | A1 | 9/2010 | Hosseini et al. |
| 2010/0257552 | A1 | 10/2010 | Sharan et al. |
| 2011/0078270 | A1 | 3/2011 | Galli et al. |
| 2011/0219293 | A1 | 9/2011 | Maxwell et al. |
| 2011/0296294 | A1 | 12/2011 | Bhadury et al. |
| 2011/0320273 | A1 | 12/2011 | Miranda-Steiner |
| 2012/0023119 | A1 | 1/2012 | Ducatel et al. |
| 2012/0215871 | A1 | 8/2012 | Zhang |
| 2012/0226561 | A1 | 9/2012 | Sinn et al. |
| 2012/0296887 | A1 | 11/2012 | Jones et al. |
| 2012/0303445 | A1 | 11/2012 | Jablokov et al. |
| 2013/0262309 | A1 | 10/2013 | Gadotti |
| 2013/0311324 | A1 * | 11/2013 | Stoll ............... H04L 67/306 705/26.7 |
| 2014/0052633 | A1 | 2/2014 | Gandhi |
| 2014/0058939 | A1 | 2/2014 | Savla |
| 2015/0088998 | A1 | 3/2015 | Isensee et al. |
| 2015/0213512 | A1 | 7/2015 | Spievak et al. |
| 2015/0379562 | A1 | 12/2015 | Spievak et al. |
| 2016/0300202 | A1 | 10/2016 | Xu et al. |
| 2017/0011383 | A1 | 1/2017 | Melzer |
| 2017/0279747 | A1 | 9/2017 | Melzer et al. |
| 2017/0293937 | A1 | 10/2017 | Gilliam |
| 2018/0205679 | A1 | 7/2018 | Melzer et al. |
| 2020/0265413 | A1 | 8/2020 | Melzer |
| 2021/0056534 | A1 | 2/2021 | Melzer |

OTHER PUBLICATIONS

Advisory Action Before the Filing of An Appeal Brief dated Feb. 27, 2019 From U.S. Appl. No. 15/272,642. (5 pages).
Advisory Action Before the Filing of An Appeal Brief dated Oct. 31, 2017 From U.S. Appl. No. 15/272,642. (5 pages).
Applicant-Initiated Interview Summary dated Feb. 6, 2020 From U.S. Appl. No. 15/919,427. (3 pages).
Applicant-Initiated Interview Summary dated Oct. 10, 2018 From U.S. Appl. No. 15/272,642. (3 pages).
Applicant-Initiated Interview Summary dated Jul. 11, 2019 From U.S. Appl. No. 15/272,642. (3 pages).
Applicant-Initiated Interview Summary dated Nov. 13, 2017 From U.S. Appl. No. 15/511,021 (4 pages).
Applicant-Initiated Interview Summary dated Aug. 21, 2017 From U.S. Appl. No. 15/272,642. (3 pages).
Applicant-Initiated Interview Summary dated Jan. 23, 2018 From U.S. Appl. No. 15/272,642. (3 pages).
Applicant-Initiated Interview Summary dated Jun. 23, 2017 From U.S. Appl. No. 15/272,642. (3 pages).
Applicant-Initiated Interview Summary dated Apr. 27, 2018 From U.S. Appl. No. 15/272,642. (3 pages).
International Preliminary Report on Patentability dated Apr. 6, 2017 From the International Bureau of WIPO Re. Application No. PCT/IL2015/050965.
International Preliminary Report on Patentability dated Jul. 20, 2016 From the International Preliminary Examining Authority Re. Application No. PCT/IL2015/050302.
International Search Report and the Written Opinion dated Jan. 11, 2016 From the International Searching Authority Re. Application No. PCT/IL2015/050965.
International Search Report and the Written Opinion dated Jul. 13, 2015 From the International Searching Authority Re. Application No. PCT/IL2015/050302.
Notice Of Allowance dated Jan. 2, 2020 From U.S. Appl. No. 15/272,642. (13 pages).
Notice of Allowance dated Apr. 10, 2020 from U.S. Appl. No. 15/919,427. (10 pages).
Notice Of Allowance dated Jan. 19, 2018 From U.S. Appl. No. 15/511,021. (11 pages).
Official Action dated Aug. 2, 2017 From U.S. Appl. No. 15/272,642. (46 pages).
Official Action dated Apr. 3, 2019 From U.S. Appl. No. 15/272,642. (39 pages).
Official Action dated Dec. 3, 2018 From the U.S. Appl. No. 15/272,642. (43 pages).
Official Action dated Mar. 16, 2018 From U.S. Appl. No. 15/272,642. (48 pages).
Official Action dated May 17, 2017 From U.S. Appl. No. 15/272,642. (37 pages).
Official Action dated Nov. 18, 2019 From U.S. Appl. No. 15/919,427. (44 pages).
Official Action dated Dec. 22, 2017 From U.S. Appl. No. 15/272,642. (56 pages).
Official Action dated Oct. 24, 2017 From U.S. Appl. No. 15/511,021. (39 pages).
Official Action dated Jun. 27, 2018 From U.S. Appl. No. 15/272,642. (44 pages).

* cited by examiner

INTERACTIVE USER INTERFACE BASED ON ANALYSIS OF CHAT MESSAGES CONTENT

RELATED APPLICATIONS

This application is a continuation of U.S. patent application Ser. No. 15/919,427 filed on Mar. 13, 2018, now U.S. Pat. No. 10,748,181, which is a continuation of U.S. patent application Ser. No. 15/511,021 filed on Mar. 14, 2017, now U.S. Pat. No. 9,917,802, which is a National Phase of PCT Patent Application No. PCT/IL2015/050965 having International Filing Date of Sep. 21, 2015, which claims the benefit of priority under 35 USC § 119(e) of U.S. Provisional Patent Applications Nos. 62/053,248 filed on Sep. 22, 2014, 62/092,344 filed on Dec. 16, 2014 and 62/183,791 filed on Jun. 24, 2015. The contents of the above applications are all incorporated by reference as if fully set forth herein in their entirety.

FIELD AND BACKGROUND OF THE INVENTION

The present invention, in some embodiments thereof, relates to messaging and, more specifically, but not exclusively, to methods and systems of performing enhancements to messaging sessions such as an instant messaging (IM) session.

Instant messaging across the Internet is a common chat application that allows instantaneous communication between one or more individuals simultaneously by transmitting information quickly and efficiently through one or more networks. Such instantaneous communication is accomplished through the use of a computer, a Smartphone, a wireless device, or any text-based communication device having a standard chat application provided by an IM service.

In today's collaborative work environment there is an increased usage of instant messaging technology for everyday business and personal functions.

In a chat session held using an instant messaging technology, each individual user typically has an input area to compose additional messages. Completed messages are sent as "chat messages." Chat messages are typically shared among the various conference participants by consolidating messages in a "chat window." The window is typically a scrolling two-dimensional display whose contents are updated in real time to present the most recent exchanges as well as a scrolling history of the chat conversation.

SUMMARY OF THE INVENTION

According to some embodiments of the present invention, there is provided a method of adapting a webpage. The method comprises monitoring textual content inputted to a user interface of an instant messaging (IM) service by at least one participant of an IM session managed by the IM service, the user interface is displayed on a display of a client device, performing an analysis of the textual content to identify an in-chat query for a product or a service and query conditions defining at least one feature of the product or the service, selecting a webpage template from a dataset comprising a plurality of webpage templates according to the in-chat query, generating an interactive UI using the webpage template, adapting the interactive UI according to at least a portion of the query conditions and an identity of the at least one participant, storing the adapted interactive UI to be available to a browser via a link, automatically inputting the link into the IM session so as to allow the at least one participant to access the adapted interactive UI using a browser running on the client device, and submitting an order for the product or the service to at least one remote server based on completing data received from the at least one participant via the adapted interactive UI.

Optionally, the method comprises sending the IM service a message indicative of at least some of the completing data so as to allow the IM service to post the message in the IM session.

Optionally, the method comprises:
managing a computerized agent subscribed to the IM service by a telephone number, the computerized agent is a participant of the IM, and
performing the monitoring using the computerized agent which analyses the textual content to identify automatically the query.

Optionally, the method comprises:
monitoring user inputs into the adapted interactive UI; and
submitting a new chat message to the IM session, the new chat message is presented to the at least one participant using the IM module and is indicative of the adapted interactive UI.

Optionally, the IM session is established in response to a user action of the at least one participant using the client terminal.

More optionally, the at least one participant comprises a plurality of participants, the user action comprises establishing a group session between the plurality of participants and a computerized agent which monitors the monitoring textual content.

More optionally, the method further comprises instructing the computerized agent to leave the IM session after the order is completed.

Optionally, the analysis is performed by natural language processing (NLP) engine.

Optionally, the at least one participant comprises the plurality of participants and in which the query is defined and the query conditions are provided by a plurality of chat messages originated from the plurality of participants.

More optionally, the at least one participant comprises the plurality of participants and in which the IM session is a group session between the plurality of participants and a computerized agent which monitors the monitoring textual content.

Optionally, the adapting comprising executing a script for executing API calls for acquiring, based on at least a portion of the query conditions, a response data from the at least one remote server and adapting the interactive UI according to the response data.

Optionally, the method comprises executing a script for executing API calls for acquiring a status data of the order from the at least one remote server and adapting the interactive UI according to the query conditions.

Optionally, the user interface is of a messenger application which allows a user to message a plurality of contacts from a contact list in addition to inputting chat messages into the IM session.

Optionally, the in chat query is encoded using at least one emoticon.

Optionally, the IM session comprises a plurality of text messages sent over a Transmission Control Protocol Internet Protocol (TCP/IP) protocol from a plurality of client terminals.

Optionally, the identity of the at least one participant is extracted from metadata of the IM session.

According to some embodiments of the present invention, there is provided a system of adapting a webpage. The system comprises processor(s), an interface adapted to receive from an instant messaging (IM) service textual content inputted to a user interface of the IM service by at least one participant of an IM session managed by the IM service, the user interface is displayed on a display of a client device, a code store comprising a code, which the at least one processor executes the following instructions in the code: code instructions for running an analysis of the textual content to identify an in-chat query for a product or a service and query conditions defining at least one feature of the product or the service, code instructions for selecting a webpage template from a dataset comprising a plurality of webpage templates according to the in-chat query conditions, code instructions for generating an interactive UI using the webpage template, code instructions for adapting the interactive UI according to at least a portion of the query conditions and an identity of the at least one participant, code instructions for storing the adapted interactive UI to be available to a browser via a link, code instructions for automatically inputting the link into the IM session so as to allow the at least one participant to access the adapted interactive UI using a browser running on the client device, and code instructions for submitting an order for the product or the service to at least one remote server based on completing data received from the at least one participant via the adapted interactive UI.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
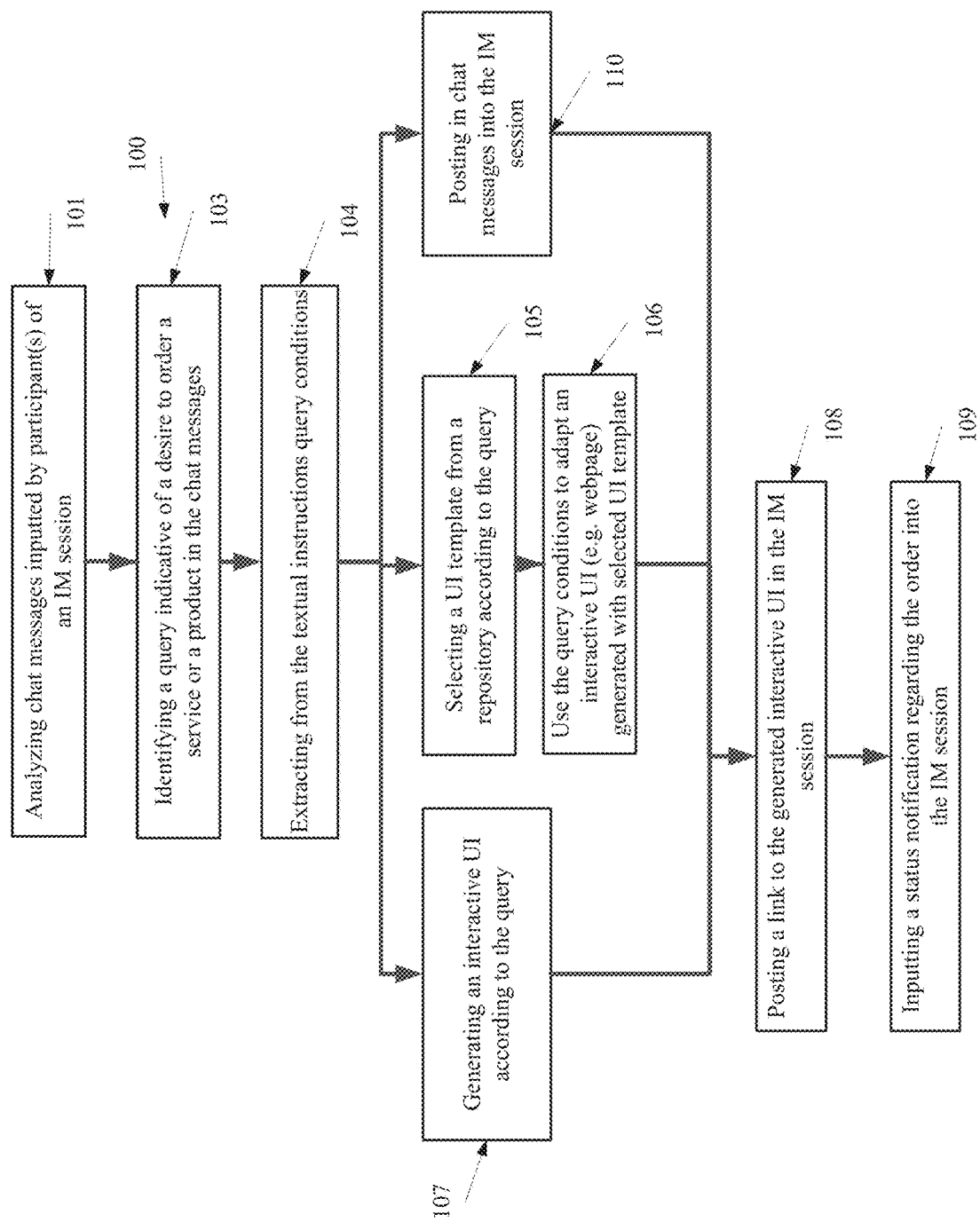
FIG. 1 is a flowchart of a method of generating an interactive user interface (UI) (e.g. hypertext markup language (HTML) coded document content viewable by a browser or a dynamically adapted window of an application) based on content extracted from user inputted chat messages of an IM session, according to some embodiments of the present invention.

The present invention, in some embodiments thereof, relates to messaging and, more specifically, but not exclusively, to methods and systems of performing enhancing a messaging session such as an instant messaging (IM) session.

According to some embodiments of the present invention, there are provided methods and systems of generating an interactive UI, for example a webpage, based on an analysis of queries detected in chat messages which are inputted to an IM session, such as a chat supported by an IM service or another textual message exchange service.

The methods and systems allows participant(s) of the IM session to inquire about information of and/or complete an order for a product or service using an interactive UI which was generated based on query conditions they defined by chat messages they inputted into the IM session without redefining these conditions.

Optionally, each one of the participants will separately access the interactive UI for inputting his selection(s) and/or confirmation(s) so as to promote a group purchase. It should be understood that the order may by for data regarding a product or a service that may be purchased at a later stage. It should be understood that the order may by for financial data from a wallet service or a credit provider, for example as described below and in International Patent Application No. PCT/IL2015/050302 which is incorporated herein by reference.

The systems and methods provide a solution to the problem of coordinating an order of a product or a service between different participants who decided to purchase the product or the service while chatting in an IM session without requiring from the participants to designate only one of them to submit the order or to pay for the ordered product or service and without requiring from the participants to provide information already described in the IM session.

Optionally, the adapted interactive UI is generated by an analysis of the content of chat messages and data related to the participants, for example as described in metadata of the IM session and/or taken from profiles of the participants.

The generated interactive UI is adapted present to the user graphical user interface (GUI) that allows them to input data that is required for completing an order and not defined in a query defining the order and inducing the generation of the interactive UI. Such a GUI, for example webpage GUI, allows presenting to the user with graphic elements for supporting one click or two click selections (or simple multi click selections), easy data navigation that does not require multiple menu routing, and/or presentation of graphical data regarding a product. The generated interactive UI solves a problem of receiving text instructions only as it allows the user to make one click or one fingertip selection instead of defining explicitly features of products.

Optionally, the generated interactive UI is added to an IM session by a link that is posted by a messaging agent; see also International Patent Application No. PCT/IL2015/050302 which is incorporated herein by reference or as part of a GUI object that is presented during the IM session to the participants.

The above methods and systems provide a technical solution to the problem of how to identify and fulfill a need expressed within a social messaging session as it identifies a query for a product or a service posted in the social messaging session, generates an adapted interactive UI which is generated to gather information missing to complete an order for the queried product or service, and posts a link to this interactive UI or present GUI object that includes the interactive UI in the IM session. The query may be identified from an analysis of previous actions of participants of the IM session, or from predications based on key words used, group dynamics, and other methods for example based on estimated preferences and/or user default selections, such as a favorite pizza, favorite airline or favorite hotel.

The above methods and systems provide a technical solution to the problem of how to identify and fulfill a need expressed within a social messaging session as it identify a query for a product or a service posted in the social messaging session, generate an adapted interactive UI which is generated to gather information missing to complete an order for the queried product or service, and posts a link to this interactive UI or present GUI object that includes the interactive UI in the IM session. The query may be identified from an analysis of previous actions of participants of the IM session, for example based on estimated preferences and/or user default selections, such as a favorite pizza, favorite airline or favorite hotel.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 is a flowchart 100 of a method of generating an interactive UI (e.g. hypertext markup language (HTML) coded document content viewable by a browser) based on content extracted from user inputted chat messages of an IM session, according to some embodiments of the present invention. The chat messages may be inputted by a user which uses a general IM editor, such as Whatsapp™, iMessage™, Facebook™ Messenger and Line™ that is also used by the user for other purposes such as any textual IM sessions with contacts, according to some embodiments of the present invention. The method allows one or more users who participate in an IM session to submit a query using the native text input user interface of the IM editor, for example Whatsapp™ and/or Line™ application. This query, referred to herein as an in-chat query, includes one or more conditions for a desired product or service. The in-chat query may be defined in chat messages from one or more participants and is identified by the computerized agent and analyzed for extracting conditions used for generating an adapted interactive UI contextually related to the user inputted content in the IM session and/or a recent portion of the IM session.

Figure 2:
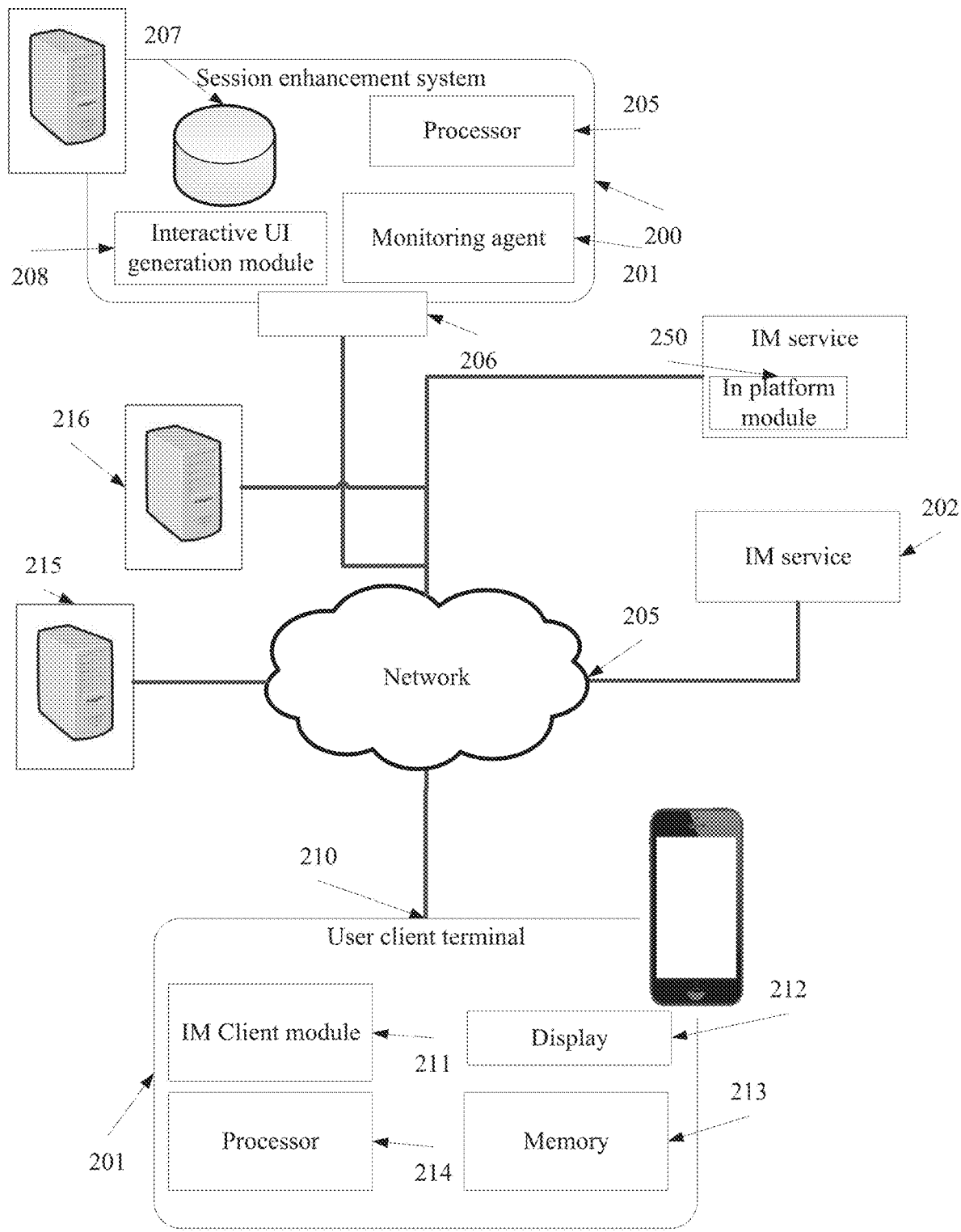
FIG. 2 is a schematic illustration of a session enhancement system for supporting a generation of a chat enhancing interactive UI based instructions and data extracted from chat messages of an IM session, according to some embodiments of the present invention.

The Session enhancement system 200 and/or the agent may be integrated into the IM service as shown at 250 of FIG. 2. In such embodiment, the agent 201 may be an application or a software module which is running on the IM service or the IM service client and monitors chat messages to perform the actions of the agent which are described herein. The agent 201 may be a computerized agent that is represented by an identifier such as a phone number or an email and added to the IM session as an additional participant. For example, unique identifier, such as an email and a telephonic identifier such as a telephone number may be used the agent to join IM sessions. This telephonic identifier is optionally added to a contact in the book address of one or more of the participants to allow adding the agent to an IM session, see for example International Patent Application No. PCT/IL2015/050302, which is incorporated herein by reference.

The in-chat query, also referred to herein as messaging instructions, is optionally textual instructions which may or may not include emoticons and/or attachment and inputted using the native text input user interface a messaging tool, such as an IM service client. The in-chat query may be for an in-chat query for acquiring information about a service or a product provide by a retailer, a credit provider, for example PayPal™, a bank and/or the like and/or for acquiring information about a service or a product from a search engine which maps products and/or services which are provided by various retailers and/or providers. Optionally, after the computerized agent identifies that an in-chat query is inputted by the user, for instance by identifying emoticons and/or by applying text analysis techniques, such as natural language processing (NLP) algorithms on the text of the IM session, the computerized agent identifies query conditions of the in-chat query by analyzing the in-chat query and optionally related segment(s) of the IM session (e.g. contextually related chat messages), one or more query conditions for a generation of a unique, optionally temporal, optionally adapted for shared usage, adapted interactive UI. The identified data used for the generation of the interactive UI includes unique identifiers of the participant(s), for instance IM service identifier(s) (e.g. phone number, name, email, subscriber identifier (ID)), description of the requested product and/or service type, description of characteristics of the requested product and/or service, and/or additional data, for example as described below. The adapted interactive UI allows the participant(s) of the IM session to complete a purchase or an order of product(s) or service(s). The adapted interactive UI may be a unique webpage coded by an interactive UI generation engine 208 in HTML, Cascade Style Sheets (CSS) and/or JavaScript. The adapted interactive UI may be an application window. The one or more query conditions, for brevity referred to herein as query conditions, are forwarded to the interactive UI generation engine 208 that generates accordingly an adapted interactive UI such as a webpages and provides a link to the adapted interactive UI, for instance a URL which is posted in the IM session or a GUI object that includes the interactive UI.

Optionally, the in chat query is analyzed to identify supporting data for facilitating the interactive UI generation engine 208 to personalize the adapted interactive UI. The supporting data may be extracted from user profile(s) of the participant(s), location data about the location of the participant(s) (e.g. from an application or a module installed in the mobile device(s) used by the participant(s) for participating in the IM session. The link or the GUI object that includes the interactive UI are entered in the IM session, for example in a chat message or the like by the agent, allowing the participant(s) to further define the purchase and/or order in the adapted interactive UI, for instance using graphical user interface GUI element(s). Inputs to the adapted interactive UI are optionally monitored by the IM communication system and reported to the participant(s) using the agent. For example, when the adapted interactive UI is a shared adapted interactive UI and the ordered service is concert tickets, a selection of a date or sit(s) by one participants may be reported by the agent in the IM session, for instance by adding a text message or an image that summarize the selection.

In such embodiments, the participants may complete purchases and/or orders in an IM session, for instance without reinputting any detail of the above mentioned query conditions to a general website, an application, without making a call, and/or without being required to remember a URL or any other address.

In use, the participant(s) may add the contact of the agent to an IM session and type or otherwise input user instructions to submit the in-chat query, for instance type "in2chat agent I would like to purchase 4 tickets to Vienna", "in2chat agent I would like to purchase 4 tickets to the Rolling Stones", and "in2chat agent we would like to a table for 4 in Chelsea, around 2000". Optionally, the in-chat query indicates which of the participant(s) of the IM session will participate in the purchase or order as beneficiaries and/or payers.

In some embodiments of the present invention, when the adapted interactive UI is a shared and adapted interactive UI, the agents provides updates regarding any or some of the inputs participants input to the shared and adapted interactive UI, allowing other participants to react on these inputs and/or to instruct the agent to confirm or disconfirm these inputs. For instance, when the shared and adapted interactive UI include GUI elements that allows user to select a data for a show, a chat message indicating what one participant selected may be posted in the IM session, allowing another participant to confirm or request another date and/or to browse into the shared and adapted interactive UI for confirm or suggest another date. Optionally, final selection may be done based on any selection method, for instance majority voting, unanimous approval, automatic confirmation which is time based and/or the like. Order or purchase notification may be posted by the agent into the IM session and/or into separate IM session between the agent and each one of the purchasers separately.

Optionally, the messages are encoded and/or set with a deletion term for enabling automatic deletion thereof from the memory of the sending and/or receiving IM session participants after a period (e.g. few seconds, minutes, and/or hours) and/or when a term is complied with. For example, the IM service is Telegram Messenger™.

Reference is now also made to FIG. 2, which is a schematic illustration of a Session enhancement system for generating adapted interactive UIs based on query conditions extracted from an in chat query identified in chat message(s) in IM session(s), posting links to the adapted interactive UIs or adding GUI objects with the adapted interactive UIs in respective IM session(s), and managing a purchase or an order according to human inputs to the adapted interactive UIs, for example when accessed by browsers, according to some embodiments of the present invention. The purchase or order may be between the participant(s) and retailer or service provider or between the between the participant(s) and the Session enhancement system 200.

Optionally, payments maybe be completed using in chat messages as described in International Patent Application No. PCT/IL2015/050302, which is incorporated herein by reference and/or in the adapted interactive UIs.

The Session enhancement system 200 is optionally implemented using one or more network connected servers, each processor 205 based, which have a port 206 for establishing communication with an IM service 202, for example an existing IM service, such as WhatsApp™, Facebook Messenger, Hangouts™, iMessage™ or Line™. The processor(s) of the Session enhancement system 200 executes code to implement an in-chat messaging agent 201 for receiving and analyzing in-chat queries, interactive UI generation engine 208 for adaptively generating adapted and optionally shared interactive UIs based on query conditions and other request data extracted from the in-chat queries, and a managing module 209 for processing data from the generated adapted and optionally shared interactive UIs, the in-chat messaging agent 201, and from systems of products or services which are connected to the generated adapted and optionally shared interactive UIs and/or the in-chat messaging agent 201. For example, the system may be deployed on Amazon Web Services (AWS) and. Elastic Compute Cloud (EC2) computers may be used for executing code implementing the described modules and engines and the described communication with the IM service, web server(s) and target server(s). Software module may be coded in Java and/or Python. Optionally, micro services are used to implement the modules and engines, For example, each software module or engine is executed as an independent service and will communicate with other services via REST API.

The executed modules 201, 208, and 209 may be stored as software components which are stored in the memory of the server(s). The port 206 is optionally a cellular interface that allows emulating a connection to the IM service 202 as a client which is identified by a telephone number, such as a Smartphone or a tablet. Such a cellular interface runs a client application such as a WhatsApp™ and Line™, which is registered to the IM service 202 using a phone number of an entity operating the agent, for example a cellular network number authenticated in an SMS authentication process, as commonly known in the art.

The Session enhancement system 200 further includes or connected to a memory or a database stored in memory 207 that stores subscribers data, for instance user records each indicative of participant account(s), such as bank account or a debit and/or credit accounts, credentials and user identifier, such as a cellular phone, ID number, history of purchases or queries, preferences, demographic data and/or the like.

The in-chat messaging agent 201 is set to receive messages of an IM session from the IM service 202, for instance via port 206 and to perform text and/or content analysis which analyzes the IM communication to identify in chat queries indicative of requests for products or services from human users which are documented in the stored in memory 207.

For example, a user uses an IM service client 211 installed on a user client terminal 210, such as a smartphone, to establish an IM session that includes the in-chat messaging agent 201 by adding a contact representing the in-chat messaging agent 201 to an IM session managed by the IM service 202. The user client terminal 210 may be any device that includes a processor 214 for executing the IM client module 211, for instance a general IM editor, and a presentation unit, such as a display 212 for presenting a graphical user interface (GUI) of the IM client module 211, for example the general IM editor and the interactive UI for example using a local browser or an application window. The IM client module 211 may be an installed application and/or a web service that is running on the user client terminal 210. The user client terminal 210 may be a handheld device or a wearable device such as Google GLASS™.

The in-chat messaging agent 201 analyses chat messages from the IM client module 211 to identify an in-chat query indicative of a request to perform an order or a purchase and the query conditions at least defining a product or a service, for example the above described query conditions. In such a manner, the in-chat messaging agent 201 manages an IM conversation with the participants to generate an adapted interactive UI and/or for updating the participants about inputs provided using the adapted interactive UI and/or regarding the purchase or order, for example as further described below.

The Session enhancement system 200 further executes or connected to an interactive UI generation module 208 which generates an adapted interactive UI according to an analysis of the requested data, including the identity of the participant(s). Optionally, the adapted interactive UI is uploaded to a web server and made available to the participant using a unique link, for example a Universal Resource Identifier (URI) such as a Uniform Resource Locator (URL) that is posted in the IM session. For example, a product requested in the in-chat query is used for selecting a suitable product defining template that is adapted to search and/or order products of a certain product type and the characteristics of product which are specified in the query conditions are used for limiting the search and/or as inputs which are injected into the suitable product defining template. Optionally, user data of the participant(s) are used for personalizing the adapted interactive UI, for instance by generating user specific areas or tools for approving or completing an action.

The Session enhancement system 200 may ran a plurality of in-chat agents 201 each for a different retailer or service. Optionally IM sessions from different IM services 202 may be analyzed using the Session enhancement system 200 (e.g. the agent may participate in numerous IM sessions simultaneously.

Reference is now made, once again, to FIG. 1. First, as shown at 101, chat messages inputted by one or more of the participant(s) of an IM session are analyzed.

Optionally, the analysis is performed after the in-chat agents 201 is added to an IM session, for example as described in International Patent Application No. PCT/IL2015/050302, which is incorporated herein by reference. For example, the in-chat agent 201 is added by a participant of an IM session. The addition may be by an IM editor, such as an IM application installed on her client terminal, for instance a Smartphone, a tablet, or a wearable device, such as Google GLASS™, or by reading a machine readable code or in response to a browser user input, for instance as described in International Patent Application No. PCT/IL2015/050302, which is incorporated herein by reference. The addition is optionally done by selecting a contact from the contact list of the IM application, for instance a contact marked by the user as "My agent" and associated with the phone number of the Session enhancement system 200.

Optionally, the user uses a GUI which is external to the IM service for instructing the in-chat messaging agent 201 to initiate an IM session with him and one or more other participants.

The in-chat agents 201 allows the Session enhancement system 200, as shown at 102, to identify instructions, optionally textual instructions, indicative of an in-chat query, for example a request for a service and/or a product in the chat messages. The messages of the IM session are analyzed by the in-chat agent 201 that receives a feed of the chat messages. This allows the in-chat agent 201 identifies the in-chat query. It should be noted the IM session may be implemented on any asynchronous chat platform. In one example, the GUI is a browser generated window or banner having fields for selecting or inserting contact details of one or more participants and optionally a title for the new IM session. The analysis of the chat messages allow identifying that a query was submitted. For example, the query may be referred to as a text that appears after one or more unique strings, unique words, unique emoticons and/or any combination thereof. Optionally, a textual analysis such as a Natural Language Processing (NLP) analysis, a semantic analysis, or a contextual analysis is used as known in the art for identifying instructions.

After the query is identified as shown at 103, query conditions defining data is still needed for completing an order of a product or a service may be extracted from the chat messages, as shown at 104. The query conditions may include a type of a product, for instance a present, groceries, electronic device, and/or the like or a service, for example a taxi, a restaurant, an hotel, an air flight, a class, a cleaning service and/or the like. Optionally, a textual analysis such as an NLP analysis, a semantic analysis, or a contextual analysis is used as known in the art for identifying at least some of the query conditions. Messaging instructions may include emoticons indicative of a product or a service, for example an emoticon of an airplane may be indicative of a desire for flight tickets and an emoticon of pizza may be indicative of desire for pizza or food.

Optionally, the query conditions includes participant(s) of the IM session which are also identified by an analysis of the in chat query or the IM session data. As in some embodiments the in-chat messaging agent 201 is part of the IM session, participants of the IM session can be automatically identified by an analysis of message decoded by the in-chat messaging agent 201, for example by extracting group information of a group chat.

Optionally, the query conditions are automatically interpreted by using information about the participant(s), for instance their location, age, gender, current location and/or previous purchases. For instance of the in-chat query is "agent, we would like to order a restaurant in the bay area for tonight, 20:00", the data item "the bay area" is understood as San Francisco bay area if the participant lives in San Francisco or currently in San Francisco and as Tampa Bay Area if the participant lives in Tampa Bay or currently in Tampa Bay. In another example, when the in-chat query is "agent, we would like to order my favorite pizza", the data defining the favorite pizza is extracted from the user profile (e.g. previous order(s)) and the order address is the address in which the querying participant currently lives or located (e.g. location information may be taken from a GPS module on his phone).

Optionally, the query conditions are automatically interpreted an analysis of in-chat messages submitted by the participant(s) previous to the in-chat query in the respective IM session, for example extracted from a discussion held between the participant(s). Optionally, the in-chat messaging agent 201 reads only messages which include a reference thereto. This assures the privacy of the participants, not giving an access to a chat content not related to the respective transaction. Optionally, the in-chat messaging agent 201 read messages in the IM session which are not directed to him. This may be used for contextual analysis, allowing the in-chat messaging agent 201 to conclude, using NLP analysis, who is paying, how much, when and for what or who participants in a purchase or an order and to what extent.

Optionally, the query conditions is automatically interpreted an analysis relationship between the participant(s). The relationship may be deduced form previous in-chat queries, an analysis of social media data and/or the like. For example, location, type of preferred food, a data of an event such as a birthday and/or the like can be deduced from social media data or from historical in-chat queries.

Optionally, as shown at 110, an order for a product or a service may be completed based on the analysis of the query and conditions, for example when no more data is required from the user for defining the desired service or product or when the details which are still required can be easily inputted, for example a single string input, a few word sentence, a number selection, an icon and/or the like. For example, when the user indicated that he would like to order his favorite pizza and the agent identifies the favorite pizza as a certain pizza from a menu of a known restaurant, the order can now be completed, for example as described in International Patent Application No. PCT/IL2015/050302, which is incorporated herein by reference.

As shown at 107 or in 105, 106, the query conditions may be forwarded to the interactive UI generation engine 208 for automatic generation of an adapted and optionally shared interactive UI, such as a webpage.

Optionally, the in-chat agent 201 selects between 110, 107 or 105, 106 based on the complexity of inputting data required from the participant for completing the order. In such embodiments 110 may be selected when limited or no additional data is required to complete an order and 107 or 105, 106 may be selected when the complexity is above a threshold, for example require more than 2, 5, 10 or any intermediate or larger number of user selections. In such embodiments, details of query conditions for an order or a purchase may be requested using in-chat messages which are inputted to the IM session, for example as described in International Patent Application No. PCT/IL2015/050302, which is incorporated herein by reference.

Additionally or alternatively, the in-chat agent 201 may be used for coordinating a date between the user, for example by accessing schedules of the participants and selecting preferred dates based on coordination logic.

Additionally or alternatively, the in-chat agent 201 serves participant(s) of an IM session for answering queries which are not related an order, for example a query for knowledge regarding a location, an event, a person, or a news article. Known methodologies as implemented by known intelligent personal assistants and/or knowledge navigator may be applied.

Optionally, as shown at 105, the query conditions are analyzed by the interactive UI generation engine 208 for selecting a webpage template from a template database stored for example in memory 207 or in any network accessible storage. For example, the template database includes a plurality of templates each adapted for an order or a product or a service of a certain type. The templates may be industry/category specific, and may include a show ticket purchasing template, a flight ticket purchasing template, a hotel room purchasing template, a food delivery purchasing template, a product or service purchasing template and/or the like. Different templates may be adapted for different numbers of purchasers or type of purchasers. A template is optionally a set of code instructions for creating an adapted interactive UI, such as a webpage or a window of an application. The code instructions may define a webpage design and one or more GUI elements, such as combo box UI, date selection UI, price range selection UI, number of participants' selection UI, and/or any interactive element that allows a user of a browser or any other interactive UI reader to select one out of a number of options. Each template may be connected to an Application Program Interface (API) of a retailer or an aggregator (such as Expedia™, EAT24™, Yelp™, eBay™ or the like), or integrated into specific partners' ERP/other platforms. Each one of the GUI elements may be adapted to inject user inputted data via the API and/or to present data received from the API.

Optionally, template may include a tree like structure that allows selecting GUI elements for the addition to the adapted interactive UI based on the query conditions and/or is selected from a template tree that includes a plurality of templates for allowing a user to complete different data depends on the provided query conditions. For example a tree having edges as conditions on the requested data may be used for selecting which GUI elements should be added to the GUI. In one example, a template tree is provided such that the root is a template with a plurality of GUI elements for defining an order without any information that is extracted from the in-chat query and the nodes of the trees template with less GUI elements for defining some of the order where information extracted from the in-chat query is used for defining the order. For example, when the user inputs a general in-chat query, such as "I would like to order a table", the general template is selected to allow the user to define all order data and when the user inputs a specific in-chat query, such as I would like to order a table in a fish restaurant for tonight 4 pp. "the template is set with a GUI to only allow the user to specify an hour and to select restaurant from a selection of fish restaurant only. The rest of the details are auto-populated. Optionally, the adaption process involves creating a set of optional selections which comply with the terms defined in the in-chat query.

Another example of a template dataset may include a plurality of GUI elements which are added to an interactive UI such as a webpage based on which data is still missing for completing an order. For example, if the order is a show tickets order and the date and number of tickets is known (e.g. as the date is provided or as there is only one available show in a specific location and the number of tickets is deduced from the number of IM participants) a GUI element for selecting seats or seat area is added to the adapted UI and the GUI elements for selecting a date or location or number of tickets are not added to the adapted UI.

Optionally, the GUI elements are updated to present products or services which comply with conditions identified in the in-chat query, optionally from one or more retailers or aggregators, for instance by querying a number of APIs with queries generated according to the query conditions.

As shown at 106, information from the query conditions may be used by the interactive UI generation engine 208 to adapt the GUI elements in the adapted interactive UI, providing participant(s) who browse to the adapted interactive UI with the ability to refine information which was already provided, for example to select from options which comply with conditions deduced from the analysis of the query conditions. Optionally, the interactive UI generation engine 208 accesses a server 216 of a retailer or a data aggregator or a deal aggregator for acquiring response data. The response data is then used for adapting the interactive UI, for example for injecting suitable data to GUI elements (e.g. selectable items to a combo box or a set of buttons presenting selectable items (e.g. 490). Communication with the server 216 may be done using API calls. The API calls may be defined in a template selected based on an analysis of the query conditions and/or query.

In an exemplary interactive UI, such as a webpage with GUI elements, is generated in response to an in-chat query such as "agent, we would like to order a fish restaurant in the bay area for tonight, 20:00". A GUI element of the adapted interactive UI may be adapted according to response data from a server managing restaurant orders to provide for a selection of restaurants which meet the in-chat query terms (fish restaurants with availability for X participants on 20:00 tonight in the bay area were X maybe derived from the number of participants and the bay area may be derived from a location analysis of any of the participants). In another example, the query conditions are marked or otherwise indicated in GUI elements of the adapted interactive UI, for example reset combo boxes to show data from the query conditions. The adapted interactive UI is optionally stored in a web server 215 and made available via a unique link that is generated by the document generation engine 208. The adapted interactive UI may be made available for a limited period and/or only until a respective order is completed and/or until the in-chat messaging agent 201 receives instructions to close the adapted interactive UI.

As shown at 108, the link to the adapted interactive UI is posted in the IM session or in separate IM session with the participant(s) of the IM session by the in-chat messaging agent 201. This allows a participant to browse to the adapted interactive UI and to refine the in-chat query an optionally to complete the order.

As described above, the adapted interactive UI may be a shared adapted interactive UI that allows the each participant of the IM session to approve or decline selections made by one or more participants of the IM session and/or to input his selection for a majority or unanimous voting mechanism. For example, each user may browse to the shared adapted interactive UI and input his preferences and/or confirm selections made by other participant(s) until majority or unanimous selections or confirmations are detected. Optionally, the shared adapted web page includes for each participant a separate approval or confirmation button or input tool, for instance a GUI that allows the user to input his selection in a different color or with a different icon, for example a profile image taken from a social profile and/or a registration process.

Optionally, an input by one participant to the IM session or in the shared adapted interactive UI may trigger the authentication of the participant, for instance by the in-chat messaging agent 201 which submits textual questions to the IM service server 202 as inputs to the IM session or in the shared adapted interactive UI. The submitted text message may be part of the IM session or trigger the initiation of a new IM session with the user. Optionally, the authentication is held by a supporting authentication module, such as an application, presenting to the user a window with security questions and/or depends for a password. The supporting authentication module may be locally managed by a locally installed application and triggered by the Session enhancement system 200.

Optionally, details of the participants of the IM session is extracted from the IM service or the IM service client to complete an order, for example extracting the associated telephone number to facilitate crediting or debiting an account associated therewith.

In use, input(s), such as selection(s) made by participant(s) in the adapted, optionally shared, interactive UI are received for completing an order or a purchase, for example by a remote server of a third party, a retailer, 216 by API calls or by a managing unit of the Session enhancement system 200. A current status or details of the order and/or the purchase may be monitoring by the managing module 209, for instance by communicating with the third party server or the managing unit. As shown at 109, the managing module 209 may forward an indication of the current status or details to the in-chat messaging agent 201 and the in-chat messaging agent 201 submits a chat message to the IM session for indicting the current status or details. Additionally or alternatively, the managing module 209 monitors selection(s) made by participant(s) in the adapted, optionally shared, interactive UI and forwards an indication of some or all of these selection(s) to the in-chat messaging agent 201 and the in-chat messaging agent 201 submits a chat message to the IM session for indicting these selection(s). In-chat messaging agent 201 may add general textual notifications such as "Bill just updated the order details", detailed textual notifications such as "Bill changed the flight date to Sep. 22, 2010", and/or add an image which summarizes the order details, such as a screenshot of the adapted, optionally shared, interactive UI and/or an image generated to reflect the data inputted into the adapted, optionally shared, interactive UI. When the order is completed, the in-chat messaging agent 201 may input a completion message. Optionally, after the order is completed and/or after a predefined period, for example after 1 minute, 5 minute, one day or any intermediate period, the in-chat messaging agent 201 leaves the IM session. Optionally, a participant may instruct the in-chat messaging agent 201 to leave by typing "agent, please leave session" or by entering an agreed icon(s).

Figure 3A:
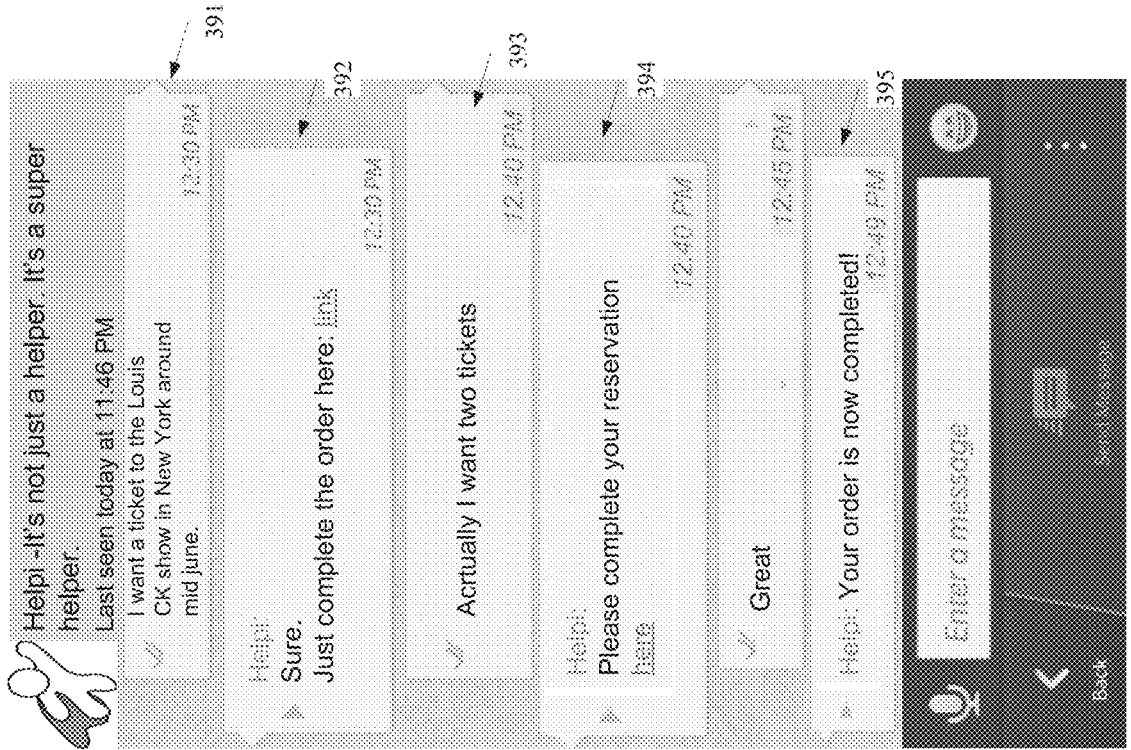
FIGS. 3A and 3B are screenshots of a general IM editor that presents an exemplary IM session between the user and a messaging agent and of an adapted UI generated for example using the method depicted in FIG. 1, according to some embodiments of the present invention.
Figure 3B:
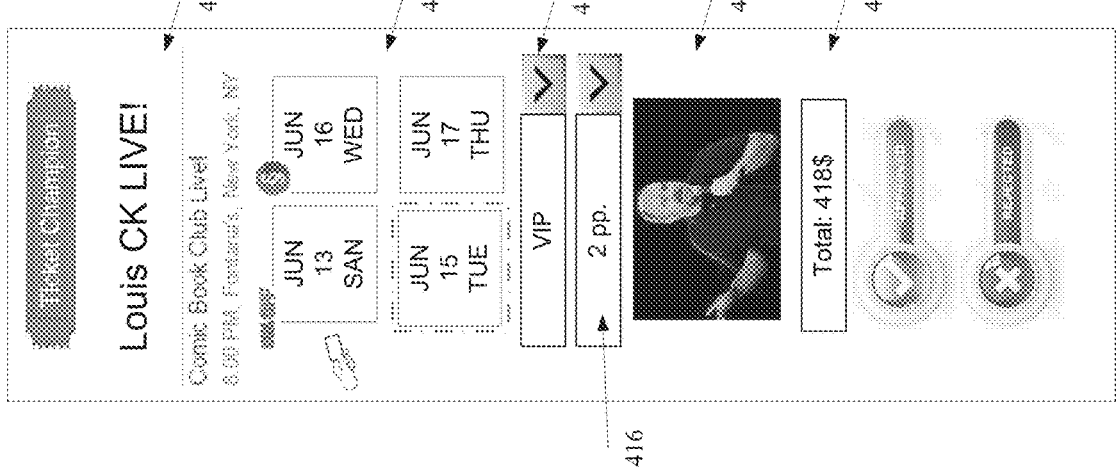

In an exemplary scenario, a user creates an IM session by adding the contact of the IM communication system 300 and the contact of the in-chat messaging agent 201 to the IM session. FIG. 3A is a screenshot of a general IM editor that presents an exemplary IM sessions between two participants and an in-chat agent wherein an in-chat query is added by one user for ordering show tickets. The user types or otherwise inputs instructions to purchase show tickets, as shown at 391. The instructions are processed by the in-chat agent, for instance using NLP engine. The in-chat messaging agent 201 extracts query conditions indicating which tickets are desired and forwards the extracted data to the document generation engine 208 that generates an adapted interactive UI, for example a webpage which is adapted for mobile presentation, for instance as shown at FIG. 3B and a link thereto. As shown at, at 393, the user may refine the in-chat query so as to allow the document generation engine 208 to generate a refined adapted interactive UI with more query conditions (e.g. a change in the number of tickets). The adapted interactive UI may be a webpage generated according to a script defined in a selected template, for instance HTML Cascade Style Sheets (CSS) and/or JavaScript.

The adapted interactive UI is stored in web server and/or cloud storage 215 and made available for access using the link and/or presented as an interactive GUI object, such as a widget of the IM service client. As shown at 392 or in 394 the in-chat messaging agent 201 posts the link or the interactive GUI object to the IM session. The adapted interactive UI is adapted according to the in-chat query. In this example, the title of specific requested show is extracted from an API of a ticket provider and fed into field 411, date selections for the user to select from (e.g. based on a range of date estimated from the in-chat query in 391) are extracted from the API of the ticket provider and fed into fields 412, an image of the show maybe acquired using a word search, for instance using an image search engine and fed into fields 413, the total price is presented in field 414 (extracted from the API of the ticket provider). Optionally, additional information which is not specified in the in-chat query is requested using GUI elements 415 (e.g. ticket type). Optionally, query conditions extracted from the in-chat query is used for adapting the GUI element for ticket number selection, for instance to show 2 tickets as a default selection based on the query conditions which is extracted from the in-chat query. As shown at 395, a status of the order, as monitored by the managing module 209, is forwarded to the in-chat messaging agent 201 that posts the status.

Figure 4A:
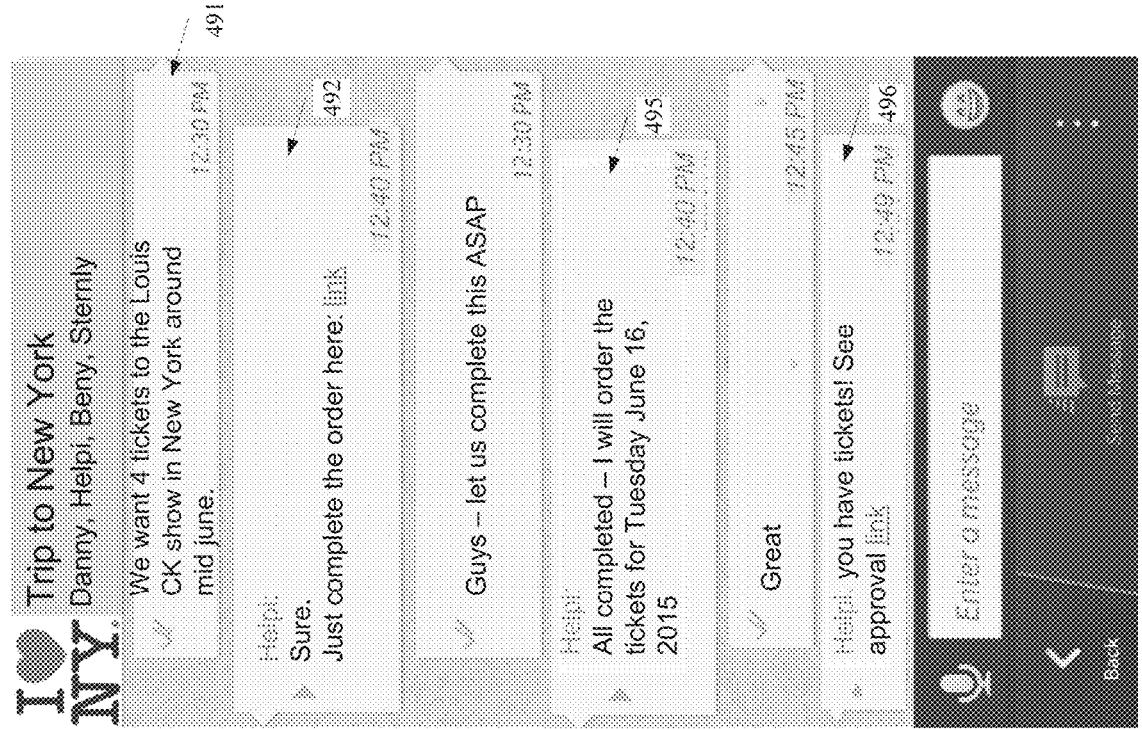
FIGS. 4A and 4B are screenshots of a general IM editor that presents an exemplary IM session group chat between a number of participants and a messaging agent, according to some embodiments of the present invention.
Figure 4B:
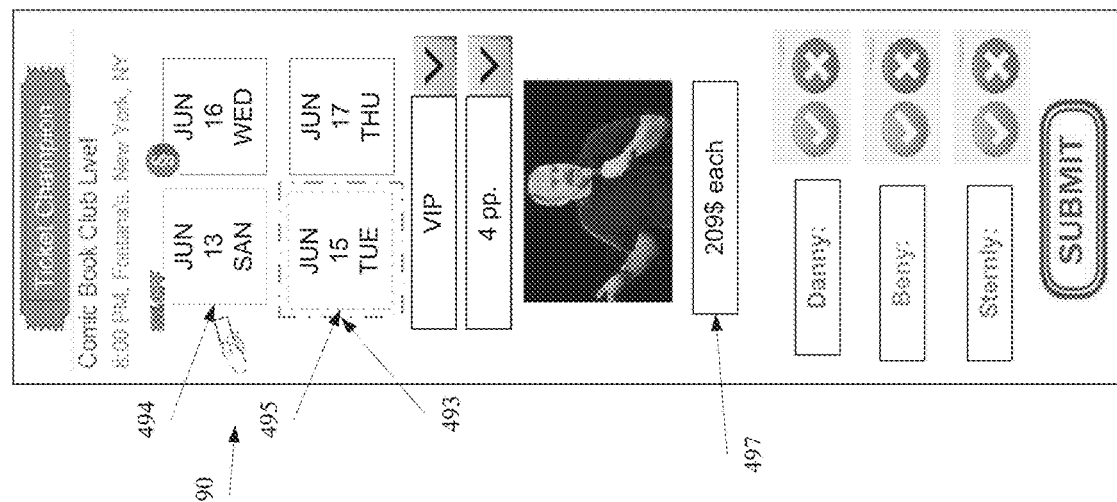

In another exemplary scenario, a user creates an IM session by adding the contact of his friend(s) and the contact of the in-chat messaging agent 201 to the IM session. FIG. 4A is a screenshot of a general IM editor that presents an exemplary IM session with exemplary IM messages wherein one of the IM session participants input an in-chat query using his general IM editor. As shown at 401, the participant types the in-chat query to order tickets for him and his friends. Now, the Session enhancement system 200 analyzes to text instructions in the in-chat query to identify the query conditions and instructs the document generation engine 208 to generate accordingly a shared adapted interactive UI, for example as depicted in FIG. 4B. A link to the shared adapted interactive UI or an interactive GUI object with the adapted interactive UI is generated by the document generation engine 208 and posted or presented, for example as shown at 492, by the in-chat messaging agent 201 in the IM session. The link allows each one of the participants to access the shared adapted interactive UI and to input his selection. Optionally, inputs of each one of the participants is marked with a different icon or color as depicted in FIG. 4B (see reference numerals 493-495). Optionally, the shared adapted interactive UI includes personalized GUI elements, each for another participant. The information about which participants are in the IM session and about their nicknames (e.g. for creating personalized GUI elements) is extracted from the IM session metadata by the in-chat messaging agent 201. Optionally, majority voting is used for taking a decision, for example after a predefined period such as 5 minutes, 10 minutes, 10 hours, a day or any intermediate or longer period. As shown at 495, 496 a status of the order, as monitored by the managing module 209, is forwarded to the in-chat messaging agent 201 that posts the status and optionally a link to the purchased product (e.g. tickets), for example to a web server of a seller. Update and statues may be presented using the above described GUI object. Optionally, payment is completed at the adapted interactive UI or in the IM session, with or without user authentication, for example as described in International Patent Application No. PCT/IL2015/050302, which is incorporated herein by reference. Optionally, a sit location is also selected by using a designated GUI element.

Figure 5B:
FIGS. 5A and 5B are screenshots of messages posted in an IM session including chat messages posted by an agent to indicate a status of an order and information about entries to the adapted interactive UI which is generated according to data extracted from this IM session, according to some embodiments of the present invention.
Figure 5A:

FIGS. 5A and 5B are screenshots of exemplary chat messages posted in an IM session including chat messages posted by an agent to indicate a status of an order and information about entries to the adapted interactive UI which is generated according to data extracted from this IM session, according to some embodiments of the present invention.

As shown at 497, the total payment for the order may be split between or among the participants, for example based on a calculation made by the system and/or instructions recorded by the in-chat agent. The above embodiments allows the group of participant to place a cumulative order to a product, splitting the cost between them without having to use only one account for the whole cost. From the in-chat agent point of view, the placed order is processed when the payments are divided to a number of different accounts (e.g. bank, credit, or debit accounts). This allows a number of people to purchase an expensive gift or a shared product, such as a coffee machine to a classroom or a lab or to share a single payment for a number of tickets (e.g. flight tickets, show tickets, entrance tickets, etc.).

Figure 6B:
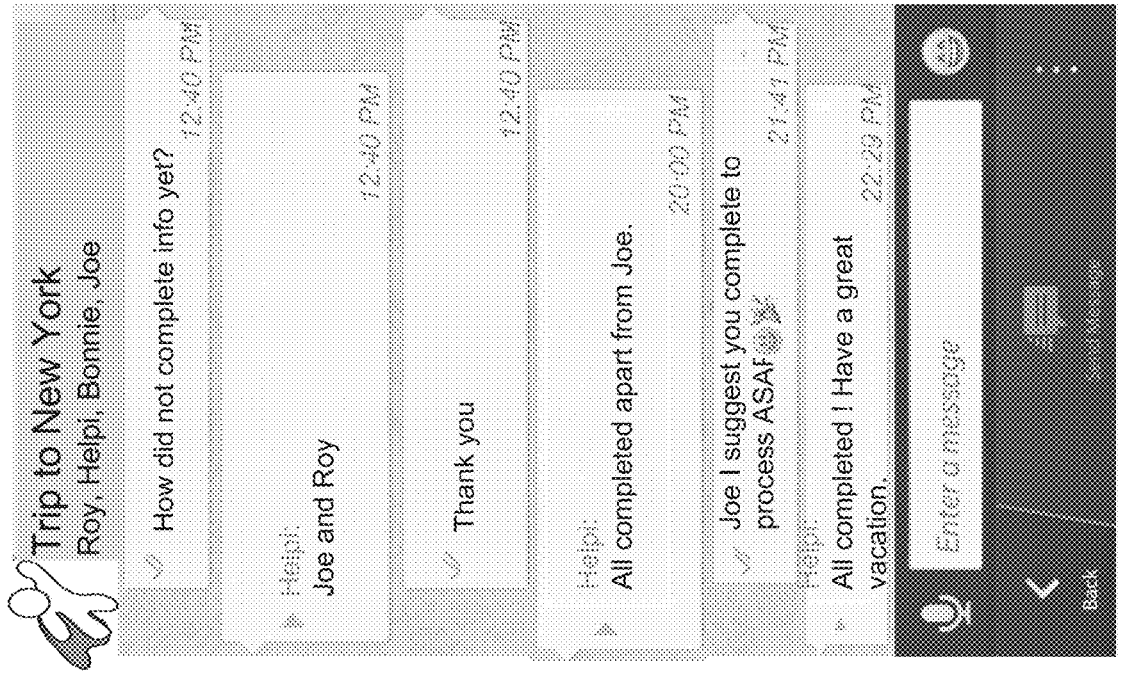
FIGS. 6A and 6B are, respectively, a screenshot of a webpage generated according to data extracted from the IM session exemplified in FIGS. 3A and 3B and a screenshot of a webpage generated according to data extracted from the IM session exemplified in FIGS. 4A and 4B, according to some embodiments of the present invention.
Figure 6A:
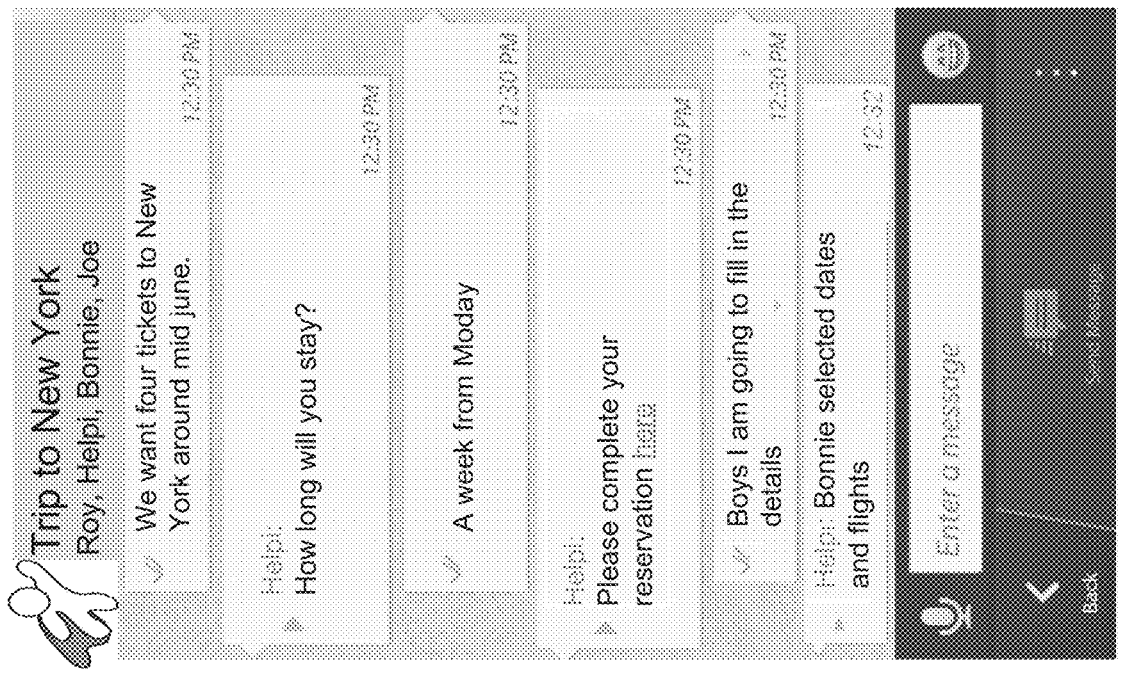

Examples of adapted and shared interactive UIs which are generated in response to a request to order a hotel room or a table in a restaurant are found in FIGS. 6A and 6B.

It should be noted that the IM client module 211 may also be used by the participant(s) to communicate with other IM session participants who may or may not be involved in the order.

According to some embodiments of the present invention, messages added to an IM session by a plurality of participants of the IM session are summarized into a single order by an agent that takes part in the IM session, for example as described above, according to some embodiments of the present invention. In such embodiments, the single order may be generated by identifying order instructions by analyzing the messages, for instance using an NLP engine. In one example, a plurality of users indicate which products they would like to receive in a common shipment and the agent summarizes the products into a single order record, such as a grocery list. The products may be supermarket products. Optionally, when instructed and/or every certain order period, for instance every one week or two weeks, the agent summarizes the products into a single order record, for instance from all the messages received during the order period. Optionally, the single order record is presented as a message of the IM session for confirmation. In another example, the single order record is forwarded to the interactive UI generation module 208 so as to allow a generation of a window or a webpage which is designated to a respective single product order. Optionally, the respective single product order is generated based on an access to a database documenting the available products of one or more providers. In use, entries in the single order record, for example list entries, are matched with records in the database to identify variations of the available products, for example which brands of a request product is found. In one example, the list include the entry "bleach" and in use the entry "bleach" is matched with records of the following variations: Clorox Splash-less bleach, Purex Mountain bleach, and Great Value bleach. Optionally, variations are ordered, filtered, emphasized, and/or automatically selected as default products based on historical preferences or purchases of the group of participants and/or any member of the group of participants. Optionally, variations are ordered, filtered, emphasized, and/or automatically selected as default products based on historical preferences of the provider or purchases of groups which are similar to the group of participants and/or any member of the group of participants. Similarity may be determined as known in the art. This allows generating a window or a webpage allowing the participants to select one of the variations by a single click or gesture, for example as selectable items in a slider, a table or a combo box. The selectable item may include an image or an icon of a product, a price, a quantity, a ranking, and/or notices were needed. In one example, a household inventory is summarized by an agent, for instance based on messages from 3 participants or more (e.g. parents and kids). In such embodiments each participant may add items in asynchronous matter, for example in different days or hours. Optionally, the agent may be instructed to remove products. Optionally, the more the product is defined in the message, fewer records are matched with it. For example, of the message specify the brand of the product, the size of the package, and/or a weight, less selectable items are added to the personalized page. In another example, participants create a delivery of multiple products, for example to invite from one or more restaurants for a food delivery such as lunch. Optionally, the webpage or the window generated based on the combination of products which are extracted from messages of a plurality of different participants of the IM session is analyzed by the UI generation module 208 for extracting a list of products. This allows generating a list of selectable items, each representing a different product (product and service are referred to herein in an interchangeable manner) and includes price, weight, cost and/or the like. Optionally, a selectable item is a slider or a combo box having a plurality of selectable sub-items, such as variations of the product. In use the user may select a sub-item in each selectable item, for instance by a single click or touch. Amount may be adapted using an amount setting graphical element. The outcome of the user selections may generate one or more delivery orders which can be forwarded to providers. The outcome of the user selections may be fed directly to a shopping cart. The outcome of the user selections may be inserted into the IM session as a message or an image to allow all the participant to see the final order.

According to some embodiments of the present invention, the in-chat agent runs a logic that allows it to request a generation of an adapted interactive UI only when the complexity of inputting data required from the participant for completing the order is above a threshold, for example require more than 2, 5, 10 or any intermediate or larger number of user selections. In such embodiments, details of query conditions for an order or a purchase can be requested using in-chat messages which are inputted to the IM session, for example as described in International Patent Application No. PCT/IL2015/050302, which is incorporated herein by reference.

Figure 7:
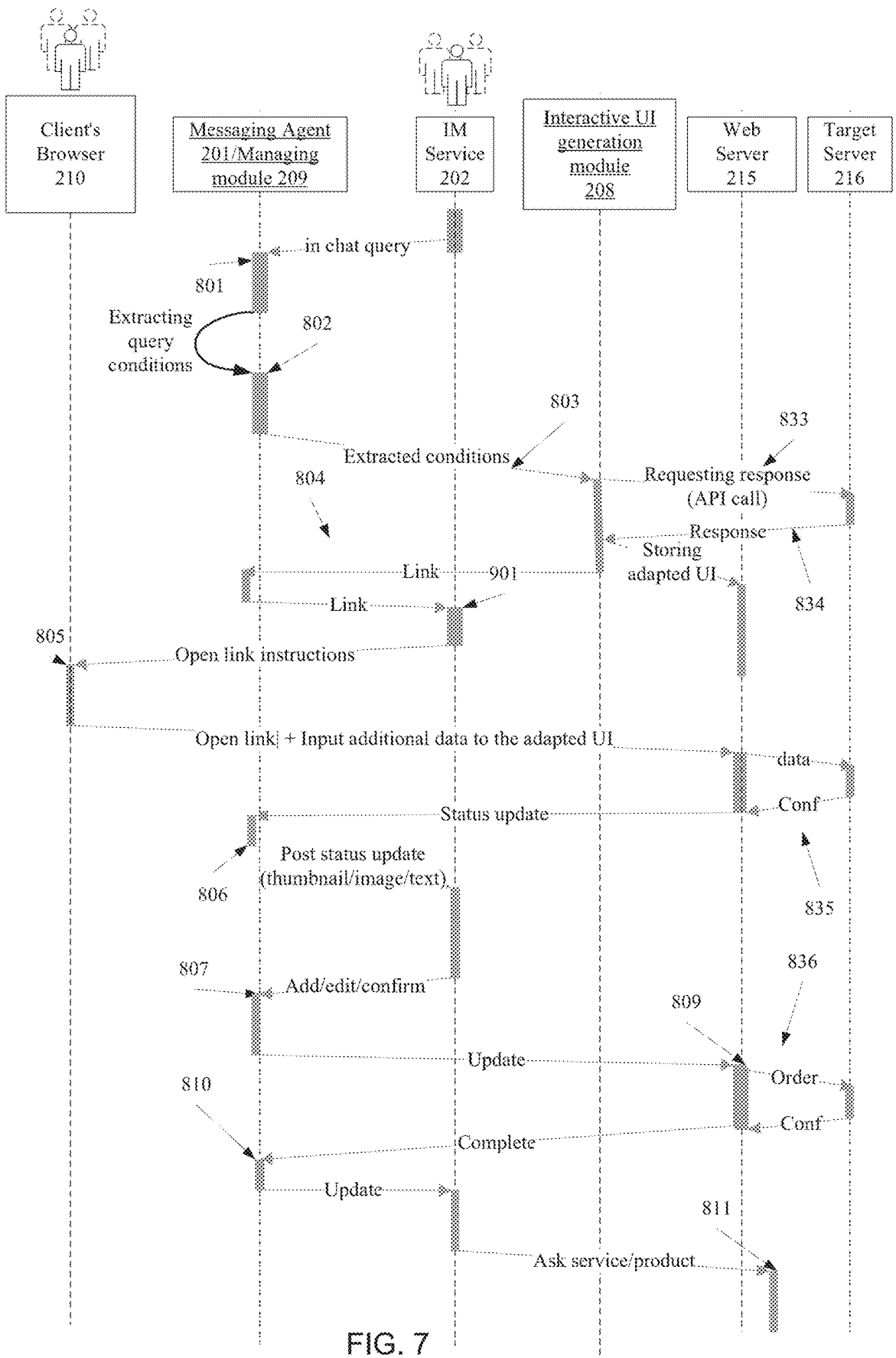
FIG. 7 is a sequence chart of data flow between a session enhancement system, an IM service, and a browser application during an exemplary IM session, according to some embodiments of the present invention.

Reference is made to FIG. 7, which is a sequence chart of data flow (e.g. messages between software modules and network messages, such as TCP/IP messages) between the Session enhancement system 200 (e.g. underlined—the in-chat messaging agent 201 or the managing module 209 and the interactive UI generation engine 208 of the Session enhancement system 200) and external entities, according to some embodiments of the present invention. The external entities include the IM service 202, browser(s) or application(s) running on the client terminal(s) 210, the target server(s) 216 (e.g. one or more servers of entities which offer or promote services or products for sale an selected as suitable for performing an order) and the web server(s) 215 hosting a generated adapted interactive UI during the exemplary IM session. The process depicted by FIG. 7 allows the Session enhancement system 200 to generate an adapted and optionally shared interactive UI for an addition to an IM session based on query conditions that is extracted from in-chat query which is inputted by a participant of an IM session. In such a manner, the created webpage may include known details about the order in advance and may allow the participant to input the missing information from a limited number of selections which meets terms already defined in the in-chat query.

First, as shown at 801, chat message(s) inputted using the IM editor running on the client 210 to the IM service 202 is intercepted using the in-chat messaging agent 201, for example an in-chat query. The messages are optionally addressed to the in-chat messaging agent 201 which was added to the IM session, for instance by a single user or a participant in a multi participant IM session, for example as described above.

Details about the participant(s) are extracted from a database based on their unique identifiers in the metadata of the IM session. As shown at 802, query conditions is extracted from the in-chat query by the in-chat messaging agent 201, for example a type of a desired service or product, a number of participants in the order, desired timing, desired location, desired product properties (e.g. color, shape, size, model, and/or the like).

Now, as shown at 803, the query conditions and information about the participant(s) is forwarded to interactive UI generation engine 208, either locally or via the network 205, optionally with a unique ID allocated for the transaction by the Session enhancement system 200.

This allows the interactive UI generation engine 208 to generate an adapted and optionally shared interactive UI. Optionally, as shown at 833, the UI generation engine 208 uses a script defining API calls for querying a remote server (e.g. 216) for acquiring as shown at 834 response data that meets condition(s) defined in the in-chat query and identified by the messaging agent 201, for example by an NLP engine. For example, allows acquiring response data for building a set of selectable items which match the condition(s) and/or to enhance the interactive UI with images and/or videos and/or advertisements related, for example semantically, to the query conditions.

As shown at 804, a link or a token for creating a link is forwarded to the in-chat messaging agent 201 for posting the link in the IM session accordingly. As shown in 901, the link is forwarded to the IM session for posting. By activating the link (by one or more of the participant(s)) browser(s) running on the client(s) are instructed to browse automatically to the generated adapted webpage. As indicated above, a GUI object that includes the interactive UI may be added to the IM session. As shown at 805, the generated webpage runs GUI element(s) facilitating the participant(s) to add data, ask for more data, or confirm order data and/or to confirm the order as described above. For example, as shown at 835, data requests and/or instructions to acquire order data are sent from the adapted UI to the target server(s) 216 from the web server 215 in response to inputs or participants to the adapted UI, for example when it is being accessed using a browser 210.

For example, FIGS. 3A and 4A and 6A-6B depict such exemplary generated adapted UI, dynamic webpages, also referred to as landing pages. Optionally, the browser rendering the landing page is minimized after information is submitted, allowing the user to automatically proceed in the IM session using the IM editor without having to actively reload.

As shown at 806, the managing module 209 may receive information indicative of the inputs to the generated adapted webpages from the web server and/or information about changes to an order related to the generated adapted webpages. The update may be textual or an image of a generated adapted webpage with indicated inputs and/or an image summarizing the order status.

Optionally, as shown at 807, the messaging agent 201 may detect instructions inputted using the IM editor by the any of the participant(s) for updating the order, for example, change or confirm order. These instructions maybe injected to the generated adapted webpages, as shown at 809 and/or injected directly to the API of a service or a product provider for completing an order. For example, as shown at 836, instructions to complete order(s) are sent from the adapted UI (from the web server 215) to the target server(s) 216 in response to inputs or participants to the adapted UI, for example when it is being accessed using a browser 210. In another example these instructions are inputted as chat messages and extracted by the messaging agent 201.

Optionally, when the generated adapted webpage receive instructions to complete an order (as shown at 810) or when the messaging agent 201 detects such instructions the API of a service or a product provider is instructed to complete the order.

The above example describes how a user action of adding an agent, such as 201, to an IM session, such as a group session allows the messaging agent 201 to reactive from participants of the IM session instructions to place an order for a product or a service during an existing discussion without having to browse to a specific webpage or input data into an independent application. According to some embodiments, the messaging agent 201 is added to an IM session established in response to another user action, for example using a camera of a client terminal running the IM module to scan a barcode or QR code or using a browser to access a GUI facilitating the user to input his cellular number or another peer cellular number for submitting an order. These user actions signal the Session enhancement system 200 to instruct the messaging agent 201 to establish the IM session with the action performing user. For instance, the QR reading triggers the sending of a message from the user with his ID or cellular number to the system. In another example, a user interface, for instance added to an interactive UI such as a webpage using a Software Development (SDK) is used for sending a message to the Session enhancement system 200 to instruct the messaging agent 201 to establish the IM session with the action performing user.

According to some embodiments of the present invention, the agent 201 communicates, either directly or via an interface with one or more credit provider services, such as a wallet service for example Android Pay, Google Wallet, Apple Pay, and/or a Bitcoin wallet, for instance by sending one or more API calls to these service.

In such embodiments, a participant may instruct the agent 201 to pay using a selected credit provider, in a selected payment method, for example debit or credit, and/or to provide details about a status of a certain account, for instance as described in International Patent Application No. PCT/IL2015/050302 which is incorporated herein by reference. In one example, a participant can instruct a financial transfer from his electronic wallet to any other wallet without having to install a designated application or to access a designated website or press a button. The agent just uses NLP process to understand payment or data access instructions and authenticate the participant as described in International Patent Application No. PCT/IL2015/050302 which is incorporated herein by reference. The participant may be identified by the wallet service based on information provided by the agent 201, for instance the user telephone number and/or ID. Optionally, a payment instruction is processed based on a set of rules governed by the agent 201, for example a priority of which payment method to use and in which order. For example, a user may select to pay using any of the following: a specific wallet API (Citi, Amex), a network wallet API (Visa, MasterCard), a generic wallet API (Google Wallet, Amazon Checkout, Apple Pay), and/or any other wallet (PayPal, gift card, points, miles, bank account). Optionally, the participant indicates with which currency to pay and/or whether to pay with points, Bitcoin or with real money. Exemplary payment method selection instructions include 'pay with Amex', 'pay with United Miles', 'pay with Citi Visa', 'pay with Amex Membership Rewards points' and/or the like.

Optionally, the agent promotes selection of payment method by posting messages which are personalized based on data from the participant profiles, for example as the following: 'how would you like to pay? Amex card members receive ×2 points for travel purchases', 'how would you like to pay? You have 24,500 miles with United that can be used for this purchase', 'how would you like to pay? Use your MasterCard and get free Travel Insurance and 'how would you like to pay? Pay 3 times with your Citi card, and receive an upgrade free.

Optionally, in order to facilitate safe communication with the wallet for example based on Secure Hypertext Transfer Protocol (HTTPS) protocol, an integrated UI is generated based on input received from the wallet service in response to the API calls submitted after the agent identified the query for the wallet in the in chat messages. For example, the interactive UI is a webpage allowing a user to provide a password, for instance as described in International Patent Application No. PCT/IL2015/050302 which is incorporated herein by reference and/or a webpage with GUI elements that allow the user to route in her account details, balance, payment rules and/or methods and/or the like.

The methods as described above are used in the fabrication of integrated circuit chips.

The flowchart and block diagrams in the Figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a message, a system, and a network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computerized method of automatically adapting an interactive user interface (UI) based on textual content acquired from an instant messaging service managed by an instant messaging server, comprising:
monitoring textual content inputted by a plurality of participants using user interfaces executed on a plurality of client devices, wherein the user interfaces are of an instant messaging (IM) service of an IM session managed by the IM service;
performing an analysis of the textual content to identify a chat text provided in the IM session by one of the plurality of participants to another of the plurality of participants;
determining a purchase intent for purchasing a product or a service based on an analysis of the chat text;
in response to determining the purchase intent, determining one of a plurality of various retailers and/or providers which provide the product or the service;
acquiring from the plurality of various retailers and/or providers, features of the product or the service;
generating an interactive user interface (UI) presenting the features to at least one of the plurality of participants;
in response to an identification of a user selection made using the interactive UI, adding the product or the service to a shopping cart for an order of the product or the service; and
providing, as a chat message in the IM session, an indication of the order for obtaining authorization from one of the plurality of participants.

2. The method of claim 1, wherein the textual content is indicative of a plurality of products.

3. The method of claim 1, wherein the interactive UI comprises one or more selectable GUI elements each indicative of one of a plurality of products or a plurality of services.

4. The method of claim 3, wherein each of the one or more selectable GUI elements comprises a graphical representation of at least one of a price, a weight, and a quantity of one of the product or the service.

5. The method of claim 3, wherein each of the one or more selectable GUI elements allows at least one of the plurality of participants to select one out of a plurality of variations of one of the plurality of products.

6. The method of claim 1, further comprising:
   accessing, via a computerized agent, another chat text provided via the IM session by one of the plurality of participants;
   determining, based on the another chat text, the authorization to order the cart.

7. The method of claim 1, wherein said determining the purchase intent is by applying natural language processing on the chat text to identify an interest in the product or service by one of the plurality of participants.

8. The method of claim 1, wherein said interactive UI is a webpage adapted based on the features.

9. The method of claim 1, further comprising sending the IM service a message indicative of completing data provided by the selections so as to allow the IM service to post the message in the IM session.

10. The method of claim 1, further comprising:
    managing a computerized agent as a participant of the IM session; and
    performing the monitoring using the computerized agent.

11. The method of claim 10, further comprising instructing the computerized agent to leave the IM session after the instructions are sent.

12. The method of claim 1, further comprising:
    monitoring user inputs into the adapted interactive UI; and
    submitting a new chat message to the IM session, the new chat message being presented to at least one of the plurality of participants and being indicative of the user inputs.

13. The method of claim 1, wherein the textual content is of a group session between the plurality of participants and a computerized agent which monitors the monitoring textual content.

14. The method of claim 1, wherein the generating comprises executing a script for executing API calls for acquiring, based on at least a portion of the textual content, response data from at least one remote server and adapting the interactive UI according to the response data.

15. The method of claim 1, further comprising executing a script for executing API calls for acquiring status data of an outcome of instructions from at least one remote server and adapting the interactive UI accordingly.

16. The method of claim 1, wherein the textual content is provided using a messenger application which allows a user to message a plurality of contacts from a contact list in addition to inputting chat messages into the IM session.

17. The method of claim 1, wherein the textual content is encoded using at least one emoticon.

18. The method of claim 1, wherein the IM session comprises a plurality of text messages sent over a Transmission Control Protocol Internet Protocol (TCP/IP) protocol from the plurality of client terminals.

19. The method of claim 1, wherein an identity of at least one of said plurality of participants is extracted from metadata of the IM session.

20. A system for automatically adapt a user interface (UI) based on textual content which is acquired from an instant messaging service managed by an instant messaging server, comprising:
    at least one processor;
    a code store comprising a code;
    wherein the at least one processor executes the following instructions included in the code:
    monitoring textual content inputted by a plurality of participants using user interfaces executed on a plurality of client devices, wherein the user interfaces are of an instant messaging (IM) service of an IM session managed by the IM service;
    performing an analysis of the textual content to identify a chat text provided in the IM session by one of the plurality of participants to another of the plurality of participants;
    determining a purchase intent for purchasing a product or a service based on an analysis of the chat text;
    in response to determining the purchase intent, determining one of a plurality of various retailers and/or providers which provide the product or the service;
    acquiring from the plurality of various retailers and/or providers, features of the product or the service;
    generating an interactive user interface (UI) presenting the features to at least one of the plurality of participants;
    in response to an identification of a user selection made using the interactive UI, adding the product or the service to a shopping cart for an order of the product or the service; and
    providing, as a chat message in the IM session, an indication of the order for obtaining authorization from one of the plurality of participants.

* * * * *